Dec. 4, 1956  K. M. BROWN ET AL  2,773,003
WASTE WATER TREATMENT
Filed April 16, 1953
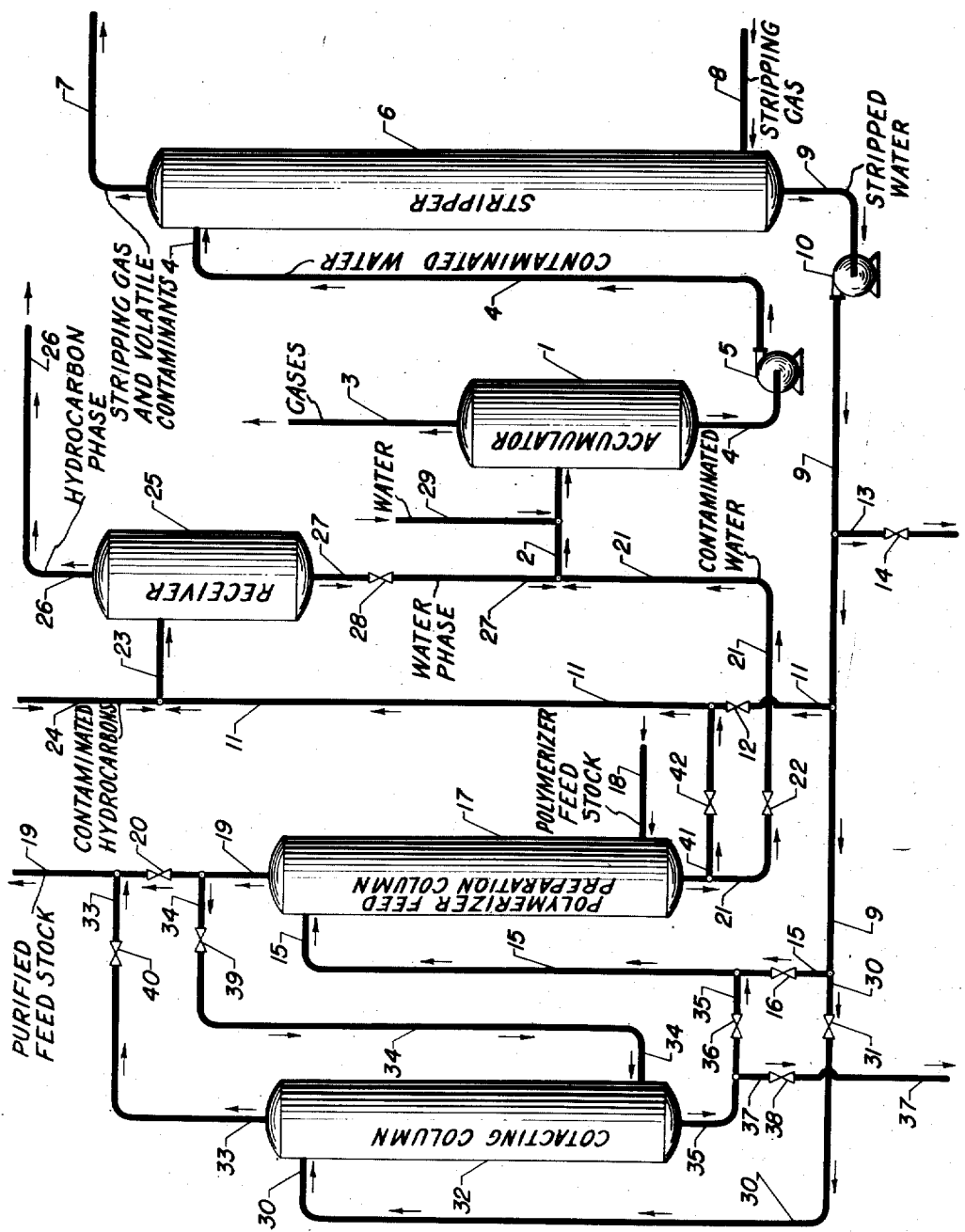
INVENTORS:
Kenneth M. Brown
James E. Gantt
By:
Chester J. Giuliani
Bernard Kramer
ATTORNEYS

2,773,003
WASTE WATER TREATMENT

Kenneth M. Brown, Hinsdale, and James E. Gantt, Elmwood Park, Ill., assignors to Universal Oil Products Company, Des Plaines, Ill., a corporation of Delaware Application April 16, 1953, Serial No. 349,282

7 Claims. (Cl. 196—1)

This invention relates to a method of treating refinery waste water and in particular to a process for treating refinery waste water so that it may be disposed of, or preferably, reused in the processing of petroleum.

In the operation of a refinery a petroleum crude oil is processed to form many products. In the course of such operations, to prepare these fractions for their intended use, many impurities that are naturally present in the crude are encountered. The more abundant of these impurities are hydrogen sulfide and ammonia, although many others are prominent such as, for example, mercaptans, cyanides, phenols, etc. Large quantities of water are used in refining petroleum for many uses, such as purifying fractions, steam distillations, dilution, heat transfer, diluting corrosive materials etc. When used as a purifying medium the water becomes contaminated with the contaminants removed from the petroleum. When otherwise used in contact with petroleum, the water will contain at least an equilibrium distribution of the contaminants contained in the petroleum. Formerly water used in processing for either purification or processing purposes, when contaminated, was disposed of by discharging the water into a stream or some other available body of water. With the increase in the size of refineries and the number of processing steps in a refining operation, the amount of contaminants reached such proportions as to pollute streams or lakes to such an extent that the fish, marine life and animals in the vicinity suffered and the obnoxious odors of refinery waste materials were a nuisance to the surrounding population. The matter of disposing of refinery waste water is at present a major refining problem.

In many areas processing water is not available in sufficient quantity so that it may be used and discarded. It is therefore advantageous and in some cases essential to reuse water rather than to continuously use fresh water. In some refining processes it is necessary to treat and purify water taken from a natural source prior to use in order to remove minerals therefrom, and in these processes it is especially desirable to reuse the water and thereby reduce the amount of treating necessary. It is an objective of the present invention to provide a process for purifying refinery waste water so that it may be disposed of without causing pollution of the surrounding bodies of water or, in a preferred embodiment, it may be purified so as to be reused in the refinery.

To accomplish the main objective of the present invention, contaminated water from various refinery sources is accumulated and reduced to substantially atmospheric pressure, after which the contaminated water is passed into a zone wherein it is countercurrently contacted with a stripping gas which removes the volatile contaminants from the water and thereby produces a contaminant-containing gas stream and a substantially volatile contaminant-free water stream. It is contemplated that the stripping gas stream will comprise sweet fuel gas, sweet natural gas, flue gas, etc., or any combinations thereof. It is particularly desirable that these gases are used since they are all available at a refinery at sufficient pressure to be used in an atmospheric stripping operation. It is particularly desirable to use sweet natural gas or sweet fuel gas for stripping since the subsequent burning of these gases oxidizes the more noxious contaminants, such as hydrogen sulfide and mercaptans, to less objectionable forms which may be vented to the atmosphere. Flue gas may also be passed through a combustion zone to effect the oxidation of the noxious contaminants. The water purified in the process may be disposed of by discarding it into a body of water or, in a preferred embodiment, it may be reused in the refinery since it is substantially free of corrosive contaminants.

Water from many refinery sources may be purified by the process of the present invention. Water used in purifying a polymerization unit feed stock and water used in the process of catalytic cracking are especially susceptible to purification by this invention. A polymerization unit feed stock must be substantially free of ammonia to prevent the poisoning of the polymerization catalyst. Scrubbing a polymerization feed stock with water transfers the ammonia and some of the hydrogen sulfide contaminants which may also be present into the water phase and thereby produces non-poisoning polymerization unit feed stock. In a catalytic cracking process water in the form of steam may be used to increase the velocity of the flow in the riser of the catalytic cracking unit or to strip the catalyst of objectionable material as, for example, the catalyst passing from the reaction zone to the regeneration zone must be stripped of entrained oil, which stripping is generally accomplished with steam. Another use of water in a catalytic cracking process is as a diluent for the aqueous phase in the overhead receiver of the primary fractionator. The water used in this manner is important in that it reduces the concentration of corrosive impurities in the water phase and thereby substantially reduces corrosion of equipment.

Generally, water from the above enumerated uses, as well as from other refinery uses, contains volatile sulfur and nitrogen-containing compounds as well as a small percentage of non-volatile compounds, mostly phenols. An extremely small quantity of inorganic compounds may also be contained in the water, mostly iron compounds that result from corrosion of the equipment. In order to prevent a build up of non-volatile impurities it is contemplated that a small portion of the circulating water stream is discarded and fresh water is added continuously to keep the non-volatile impurities at a tolerable level. In many cases the water normally used in processing will be sufficient fresh water. The build up of non-volatile oil soluble impurities may be eliminated in another manner which is presented here as a special embodiment of this invention. In a special embodiment of this invention water from various refinery sources contaminated with volatile and non-volatile contaminants is passed into countercurrent contact with a stream of stripping gas which results in the removal of the volatile contaminants from the water. The non-volatile contaminant-containing water stream is then passed into countercurrent contact with a purified polymerization unit feed stock which results in the removal of oil soluble contaminants, such as phenols, from the water and transfer thereof into the polymerization unit feed stock. The introduction of phenols, the most abundant oil soluble contaminant into a polymerization unit feed stock is not harmful to the polymerization catalyst and the phenols and reaction products are desirable constituents of the polymerization unit products in that they are mild oxidation inhibitors. The water passing from contact with the purified polymerization unit feed stock is substantially pure containing only an extremely small quantity of inorganic non-volatile material. The oil soluble contaminant-free water is passed into countercurrent contact with raw polymerization unit feed stock which results in the removal of ammonia and hydrogen sulfide from the raw polymerization unit feed stock. Another, generally much small portion of the organic contaminant-free water is passed to a steam generator wherein it is converted to steam for use in refinery processes. It is contemplated that the steam, after use and condensation, is returned to the purification process. The net result of passing a small stream of organic contaminant-free water through a steam generator is to continuously remove inorganic non-volatile compounds from the water stream by depositing them in the steam generator to be disposed of with the blow down water of the steam generator. This is not harmful to the steam generator since the water does not contain corrosive contaminants, which were previously stripped out, but just a small amount of corrosion products. When it is desired to dispose of water from this process, the organic contaminant-free water, prior to contact with polymerization feed, is the water that is disposed of in that it contains no noxious contaminants and may be discharged into a natural body of water without causing harmful effects.

The outstanding characteristics of the process of this invention, and those that particularly enhance its commercial value are first, that the only cost involved to incorporate the present process into an existing refinery flow is the cost of the equipment. Stripping gas is already available in a refinery at sufficient pressure for the operation of the present process and it may be directed through the stripper prior to passing to its ultimate destination. When a catalytic cracking unit is used in the refinery, there is an abundance of regenerator flue gas at a pressure in excess of 10 p. s. i. When fuel gas or natural gas is used as a fuel, the gas must be supplied to the burners at sufficient pressure, and for a very small additional expense these gases may be passed through the stripping column prior to passing them into a burner. Inasmuch as the stripping column may be operated at atmospheric pressure, no elaborate pumping equipment to charge contaminated water thereto will be necessary. A second commercial advantage is that extremely large volumes of stripping gas are available for the amount of water to be purified. When regenerator flue gas is to be used as the stripping gas, it is also an advantage that large volumes of high temperature gases are available, to add heat to the process. When regenerator flue gas is used as the stripping gas, the process in effect will consist of venting the regenerator flue gases to the atmosphere through a stripping column and a subsequent combustion zone.

The accompanying drawing is a schematic flow diagram of one embodiment of the present invention, which is presented to further illustrate this invention but is not intended to unduly limit the invention to the particular embodiment herein described. The drawing is a schematic flow diagram of the present invention in conjunction with the water phase from a catalytic cracking unit and a polymerization unit feed preparation column. It is, of course, understood that water from any refinery sources may be purified by the process of this invention, however, this specific embodiment is described for the sake of simplicity.

Referring now to the drawing, contaminated water passes through line 2 and into the intermediate portion of accumulator 1 wherein volatile gases are vented and the pressure is reduced to atmospheric. Accumulator 1 is provided with vent line 3 in the upper portion thereof and line 4 in the lower portion thereof. Contaminated water passes through line 4 and pump 5 into the upper portion of stripper 6. In stripper 6 the contaminated water descends and is countercurrently contacted with a stream of stripping gas entering the lower portion of stripper 6 through line 8. Stripping gas, along with the volatile contaminants contained in the contaminated water, discharge from the upper portion of stripper 6 through line 7. The gas in line 7 may pass to a burner or may be vented to the atmosphere or used in any other desired manner as, for example, an odorant for natural gas. Stripped water substantially free of volatile contaminants passes from the lower portion of stripper 6 through line 9 and pump 10 and, in this particular embodiment, splits into at least two streams. One of these streams passes through line 11 and valve 12 and into line 23, wherein the stream is commingled with the net fractionator overhead from the primary fractionator of a catalytic cracking unit, supplied by way of line 24. The net fractionator overhead contains gasoline, water, volatile impurities and all other material discharging from a catalytic cracker that boils, roughly, at a temperature below 430° F. The water from line 11 and the net fractionator overhead commingle in line 23 and pass into receiver 25, wherein the stream separates into a hydrocarbon phase and a water phase. The water phase dissolves equilibrium proportions of all water soluble material in the gasoline fraction. Many highly water soluble impurities in the gasoline fraction are extremely corrosive and, in order to avoid concentrated corrosive solutions, it is necessary to dilute the water phase by the manner shown, i. e. water entering receiver 25 through line 11. Receiver 25 is provided with line 26 in the upper portion thereof, through which the hydrocarbon phase passes to be further processed. The water phase in receiver 25 passes through line 27 and valve 28 into the aforementioned line 2 which discharges into accumulator 1.

Another stream from line 9 passes through line 15 and valve 16 into the upper portion of polymerization feed preparation column 17. In feed preparation column 17 purified water from line 15 countercurrently contacts polymerization feed stock entering the lower portion of column 17 through line 18. Polymerization feed stock is contaminated, generally, with ammonia which is a poison for polymerization catalyst and with hydrogen sulfide. The countercurrent contact of water and feed stock produces a substantially ammonia-free polymerization charge stock and a water stream contaminated with ammonia and hydrogen sulfide. The purified feed stock passes from the upper portion of column 17 through line 19 and valve 20 into a polymerization unit. The contaminated water passes from the lower portion of column 17 through line 21 and valve 22 into the before mentioned line 2 which discharges into accumulator 1. It may be noted here that the countercurrent contact of water and polymerization feed stock removes phenols from the water phase and thereby produces a phenol-free contaminated water stream passing from the lower portion of column 17. As will be hereinafter set forth at least a portion of the pretreated polymerization feed stock may be used to advantage in another embodiment of this invention.

One or more streams passing through line 9 may be directed to other portions of the refinery, as illustrated by line 13 and valve 14, to be used as contaminant-free water, or may be discarded as water free of volatile noxious contaminants. It may be necessary, in order to maintain a tolerable level of non-volatile contaminants in the circulating water stream, to continuously discard a small portion of the water and to continuously add a correspondingly small portion of fresh water. Line 29 entering line 2 is included in the drawing to represent water from any other suitable source which may be purified by the present process. It is contemplated that the water going to various refinery processes through line 13 and valve 14 may be returned for further purification through line 29.

In a specific and especially preferred embodiment of the present invention, water may be treated to remove both volatile and some non-volatile contaminants. In the drawing, the water from line 9 may be passed into line 30, containing valve 31, by opening valve 31 and closing valve 16 thereby causing the flow through line 15 to be stopped. This valve manipulation causes water to flow through line 30 into the upper portion of column 32. To cause a corresponding flow of polymerization unit feed stock it is necessary that the flow in line 19 discharge into line 34 which is accomplished by closing valve 20 and opening valve 39 which causes polymerization unit feed stock to flow through line 34 and into the lower portion of column 32. Column 32 is provided in the upper portion with line 33 which carries polymerization unit feed stock through valve 40 into line 19. Column 32 is further provided in the lower portion thereof with line 35 carrying water through valve 36 and into the before mentioned line 15. Line 37 containing valve 38 passes from line 35. Through the arrangement herein described pure water may be obtained by the following method. Contaminated water entering accumulator 1 through line 2 is vented and reduced to atmospheric pressure through line 3 and passes through the lower portion of accumulator 1 through line 4 and pump 5 and into the upper portion of stripper 6. In stripper 6 volatile impurities are removed from the contaminated water by means hereinbefore described, and a volatile contaminant-free water stream passes from the lower portion of stripper 6 through line 9 and pump 10. The water in line 9 contains non-volatile oil soluble impurities which are largely phenols. The water in line 9 passes into line 30 through valve 31 and into the upper portion of column 32 wherein the water is countercurrently contacted with purified polymerization unit charge stock which was purified as will be hereinafter discussed. Since phenols and other organic contaminants are preferentially soluble in hydrocarbon, the purified polymerization unit charge stock removes the non-volatile phenols etc. from the water and produces a phenol-containing polymerization feed stock which passes from the upper portion of column 32 through line 33 and valve 40 into the before mentioned line 19 and then to a polymerization unit. Water, now substantially free both of volatile and organic non-volatile contaminants, passes from the lower portion of column 32 through line 35 and valve 36 and into the upper portion of column 17 wherein it countercurrently contacts raw polymerization unit feed stock. Decontaminated water from line 35 also passes through line 37 and valve 38 to be reused or discarded. The water in line 37 is purified to the extent that it may be passed into natural waterways without causing pollution or it may preferably be recycled within the unit by passing it to other refinery operations. The water in line 35 contains only inorganic impurities such as iron compounds resulting from corrosion of the plant equipment. This water may be further purified by passing it through a steam generator, a use for which it is highly suitable, wherein the non-volatile inorganic salts will be removed in the steam generator blow down. The resulting steam, when condensed in subsequent refinery operations as, for example, when passing into a catalytic cracker and ultimately overhead with the cracked products, may be returned to accumulator 1 to repeat the foregoing cycle. Although the present process is described in relation to a polymerization feed preparation unit, it is understood that any suitable hydrocarbon stream may be used to extract phenols etc. from the water including straight run gasoline, natural gasoline, naphtha, kerosene, etc.

In another special embodiment of the present invention, the water may flow in series through the various processing stages, usually from a zone of low contamination to one of high contamination or from a zone of high pressure to a zone of low pressure or both. As a specific example of this flow, by closing valve 22 and opening valve 42, water contaminated with small amounts of ammonia and hydrogen sulfide may be passed into line 11 to commingle with catalytic cracker effluent in receiver 25 instead of passing through line 21 and into accumulator 1 as before. Water used for dilution need not be as free of contaminants as that used for scrubbing, and by this means a more efficient use of the water may be realized.

The apparatus as herein described is merely a schematic diagram and it is not intended to be an engineering drawing of the proposed process. It will of course be necessary that pressure, temperature, and level controls be used on the various columns as well as suitably placed valves and pumps to effect the flow of material consistent with pressure levels maintained at various portions of the plant. Many other modifications of this invention may be made without removing the modified process from the broad scope of this invention.

Columns 32 and 17 will contain a means of effecting intimate contact of two substantially immiscible liquid streams which may comprise sieve deck or bubble cap arrangements on the interior of the column to effect a stagewise countercurrent contact. The columns may also contain suitable packing material such as Berl saddles, Raschig rings or the like. Stripper 6 will contain a suitable means of effecting countercurrent contact of a liquid stream and a gas stream. Such means may include any of the standard fractionator devices such as bubble cap trays, sieve decks, packing or the like.

We claim as our invention:

1. The method of treating waste water from petroleum refining processes to remove volatile contaminants and phenols therefrom which comprises passing said waste water into countercurrent contact with a stream of stripping gas, separately recovering the resultant volatile contaminant-containing stripping gas stream and a treated water stream containing phenols, and passing at least a portion of said treated water stream into contact with volatile contaminant-containing hydrocarbons to remove volatile contaminants from the hydrocarbons and to effect a transfer of phenols from the water stream to the hydrocarbons.

2. The method of treating waste water from a hydrocarbon polymerization unit feed stock preparation process which comprises passing said water, contaminated with hydrogen sulfide, ammonia and phenols, into contact with a stream of stripping gas, separately recovering the resultant hydrogen sulfide and ammonia-containing stripping gas stream and a treated water stream containing phenols, and returning at least a portion of said treated water into contact with hydrocarbon polymerization unit feed stock to effect a transfer of phenols from the water to said hydrocarbon stock.

3. The method of treating the water phase of the effluent from a catalytic cracker, said water phase containing volatile contaminants and phenols, which comprises passing said water phase into contact with a stream of stripping gas, recovering the resultant volatile contaminant-containing stripping gas stream and a treated water stream containing phenols, and passing at least a portion of said treated water into contact with hydrocarbons in said catalytic cracker to effect a transfer of phenols from the water to said hydrocarbon.

4. The method of treating waste water from petroleum refinery processes to remove contaminants therefrom which comprises passing said waste water into contact with a stripping gas stream, separately recovering a volatile contaminant-containing stripping gas stream and a treated water stream, passing at least a portion of the resultant substantially volatile contaminant-free water stream into contact with a contaminant-free hydrocarbon polymerization unit feed stock, separately withdrawing the resultant oil soluble contaminant-containing polymerization unit feed stock and a substantially contaminant-free water, passing at least a portion of said contaminant-free water into contact with raw hydrocarbon polymerization unit feed stock, separately recovering the resultant contaminant-free polymerization unit feed stock and a volatile contaminant-containing water, and returning the latter to contact with stripping gas.

5. The method of treating water from a hydrocarbon polymerization unit feed preparation process and from the water phase of a catalytic cracking unit overhead product which comprises passing a stream of water from said catalytic cracking unit overhead product and said polymerization unit feed preparation process concurrently into countercurrent contact with a stream of stripping gas, separately recovering a volatile contaminant-containing stripping gas stream and a treated water stream, passing at least a portion of the resultant treated water stream now substantially free of volatile contaminants into contact with a contaminant-free hydrocarbon polymerization unit feed stock, thereby removing phenols from said water stream into said polymerization stream, separately withdrawing the resultant phenol-containing polymerization unit feed stock and phenol-free water, passing at least a portion of said phenol-free water into contact with fresh hydrocarbon polymerization unit feed stock, thereby removing volatile contaminants from said fresh polymerization unit feed stock, separately recovering contaminant-free polymerization unit feed stock and volatile contaminant-containing water, returning the latter to contact with stripping gas, passing a second portion of said treated water into contact with the net overhead product of said catalytic cracking unit, separating the resultant mixture into a water phase and a hydrocarbon phase, and passing said water phase into countercurrent contact with said stripping gas.

6. The method of treating water from a hydrocarbon polymerization unit feed preparation process and from the water phase of a catalytic cracking unit overhead product which comprises passing a stream of water from said catalytic cracking unit overhead product into countercurrent contact with a stream of stripping gas, separately recovering a volatile contaminant-containing stripping gas stream and a treated water stream, passing at least a portion of the resultant treated water stream, now substantially free of volatile contaminants, into countercurrent contact with hydrocarbon polymerization unit feed stock, separately withdrawing a purified polymerization unit feed stock and a volatile contaminant-containing water stream, passing the latter into contact with catalytic cracker overhead product as a portion of said water phase.

7. The process of claim 1 further characterized in that said stripping gas is selected from the group consisting of sweet natural gas, sweet fuel gas and flue gas.

References Cited in the file of this patent

UNITED STATES PATENTS

| | | |
|---|---|---|
| 1,132,594 | Lloyd | Mar. 23, 1915 |
| 1,866,417 | Mackert | July 5, 1932 |
| 2,106,734 | Gollmar | Feb. 1, 1938 |
| 2,179,008 | Campbell | Nov. 7, 1939 |
| 2,285,190 | Craig et al. | June 2, 1942 |